S. Miller.
Harvester Rake.
Nº 8225. Patented Jul. 15, 1851.
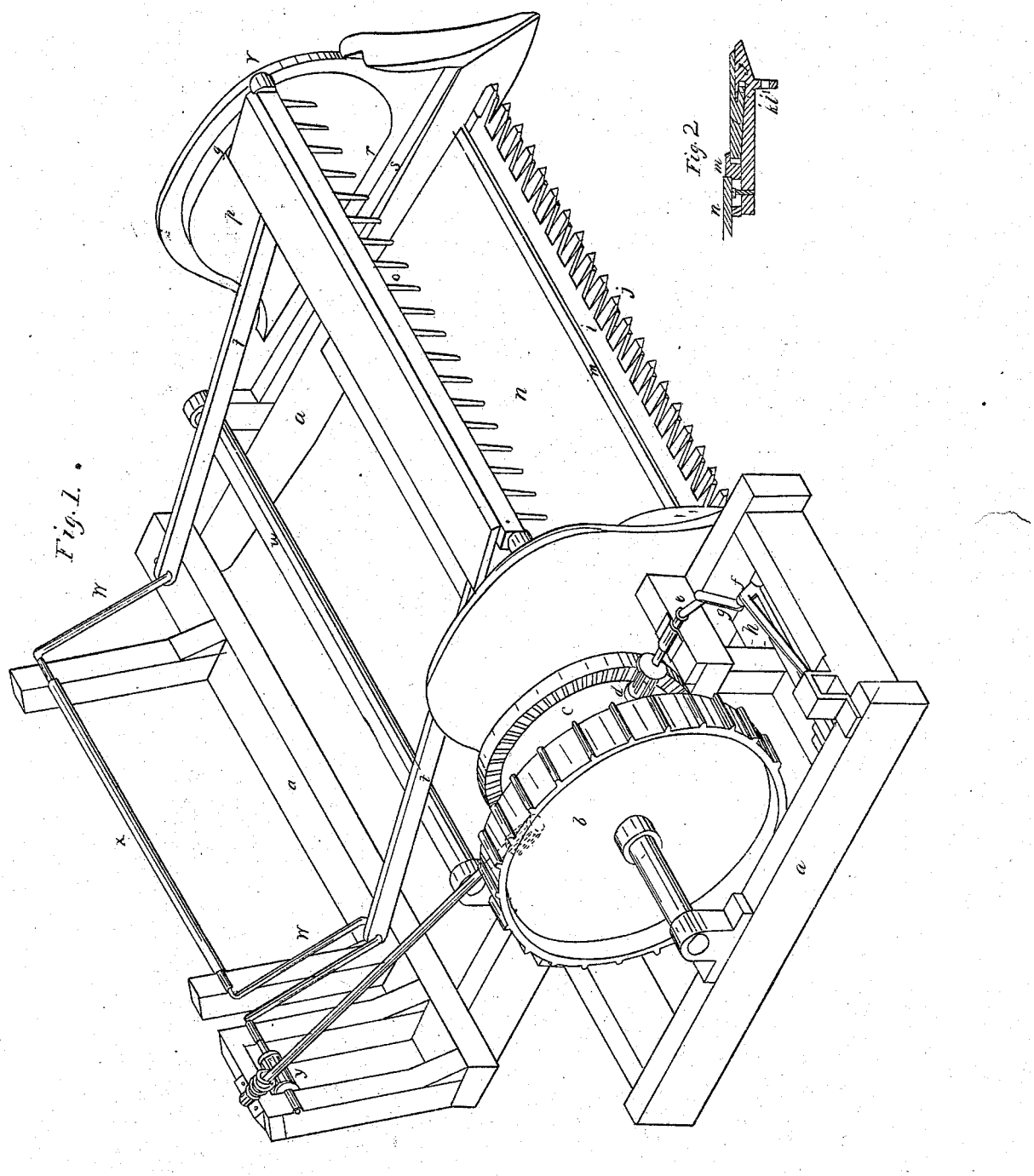

UNITED STATES PATENT OFFICE.

SYLVANUS MILLER, OF URBANA, OHIO.

IMPROVED RAKE FOR HARVESTING-MACHINES.

Specification forming part of Letters Patent No. 8,225, dated July 15, 1851.

*To all whom it may concern:*

Be it known that I, SYLVANUS MILLER, of Urbana, in the county of Champaign, State of Ohio, have invented new and useful Improvements in Reaping and Harvesting Machines, of which the following is a full, clear, and exact description, reference being had to the annexed drawings, making part of this specification.

My invention has reference to the guidance and operation of the rake.

In the annexed drawings, the same letters indicate like parts.

Figure 1 is a perspective view. Fig. 2 is a sectional view of the cutting apparatus.

$a$ is a suitable frame of wood.

$b$ is the driving-wheel.

$c$ is a bevel-wheel upon the shaft of the driving-wheel. This bevel-wheel actuates a trundle, $d$, which, by suitable wrist, $e$, and arms $f\ g\ h$, imparts a reciprocating motion to the gang of knives $i$, resting upon the guards $j$. These knives on their under sides slope somewhat downward toward the front, as does also the tongue $k$, which, fitting so as to slide within the groove $l$ in the guards, holds the forward edge of the knives firmly upon the guards. To these sloping surfaces the portion of the guards with which they come in contact is made to correspond. The object of these sloping surfaces is that the knives may be held down firm and made to maintain a hard pressure upon the guards, and as fast as they wear loose, by simply pressing the knives forward and bringing forward the clamp $m$, which holds down their rear edge, and securing the clamp to its place by a screw passing through a slot in the clamp, the knives are again brought to their proper bearing. This adjustability laterally and slight downward tendency of the knives as they wear, so as to keep them bearing hard upon the guards, is evidently of very essential importance in a mechanism which, like this, is intended to operate upon a refractory material on the principle of shears or scissors.

One of the most formidable defects in harvesting-machines which have been some time in use is the liability of the straw to double in between the faces of the knives and guards or of the two sets of knives, as the case may be.

$n$ is a platform, which catches the grain as it falls before the stroke of the knife.

$o$ is a rake, which has such a motion given to it as to drag the grain at proper intervals from the front of the platform onto the ground behind it. These intervals occur sufficiently frequent to deposit each time upon the ground just enough for a sheaf.

The motion imparted to the rake is analogous to that which would be given by the human hand, such a motion being deemed preferable to that of a revolving rake for several reasons, among which are, that by the proposed method the stalks are less liable to disarrangement and scattering, and they are also collected in convenient gavels for binding.

$p$ is a slab whose outer edges, $q$, forms a track of form suitable for guiding the rake properly forward and downward, and whose lower edge, $r$, forms, in conjunction with the ledge $s$, a channel by which the rake is guided backward along the platform until, reaching the rear extremity of its sweep, its arms $t$ are so brought in contact with the roller $u$ as to suddenly tilt the head of the rake upward, and thus to place it in a position for ascending and passing forward again upon the upper track. The passage of the rake is facilitated by rollers $v$, and it is impelled by wrists $w$ upon a shaft, $x$, which derives its motion from suitable gearing, $y$, communicating with the bevel-wheel $c$.

Having thus described the nature and construction of my harvesting apparatus, what I claim therein as new, and desire to secure by Letters Patent, is—

The guide $p\ q\ r\ s$, arranged as described, in connection with the tilting roller $u$ for the guidance of the rake in a path similar to that which it would receive from the human hand, by which it removes periodically the grain or grass from the bed and frees itself by the retraction of the teeth of the rake endwise.

In testimony whereof I have hereunto set my hand before two subscribing witnesses.

SYLVANUS MILLER.

Witnesses:
M. R. MILLER,
EDWARD H. KNIGHT.